United States Patent
Zhang et al.

(10) Patent No.: US 8,630,688 B2
(45) Date of Patent: Jan. 14, 2014

(54) WINDING FOR USE IN HIGH TEMPERATURE SUPERCONDUCTING GENERATOR

(75) Inventors: Jiping Zhang, Winter Springs, FL (US); William R. McCown, Winter Springs, FL (US)

(73) Assignee: Siemens Energy, Inc., Orlando, FL (US)

( * ) Notice: Subject to any disclaimer, the term of this patent is extended or adjusted under 35 U.S.C. 154(b) by 1481 days.

(21) Appl. No.: 12/042,745

(22) Filed: Mar. 5, 2008

(65) Prior Publication Data

US 2008/0227648 A1 Sep. 18, 2008

Related U.S. Application Data

(60) Provisional application No. 60/918,406, filed on Mar. 16, 2007.

(51) Int. Cl.
*F16C 39/06* (2006.01)

(52) U.S. Cl.
USPC ......... 505/166; 505/905; 310/179; 310/261.1

(58) Field of Classification Search
USPC .................. 505/166, 905; 310/179, 261.1
See application file for complete search history.

(56) References Cited

U.S. PATENT DOCUMENTS

| | | | |
|---|---|---|---|
| 4,185,216 A | 1/1980 | Mole et al. | |
| 4,583,014 A | 4/1986 | Murphy, Sr. et al. | |
| 4,980,964 A | 1/1991 | Boeke | |
| 5,175,396 A | 12/1992 | Emery et al. | |
| 5,323,079 A | 6/1994 | Nieves et al. | |
| 5,482,919 A | 1/1996 | Joshi | |
| 5,760,516 A | 6/1998 | Baumann et al. | |
| 6,559,384 B1 | 5/2003 | Angell et al. | |
| 6,617,714 B2* | 9/2003 | Laskaris | 310/54 |
| 6,730,851 B2* | 5/2004 | Ladie' et al. | 174/125.1 |
| 6,753,493 B2* | 6/2004 | Rhein et al. | 218/120 |
| 6,921,992 B2 | 7/2005 | Frank | |
| 6,960,859 B2 | 11/2005 | Baumann et al. | |
| 7,080,941 B1* | 7/2006 | Benjamin et al. | 374/179 |
| 7,088,020 B2 | 8/2006 | Holly, III et al. | |
| 7,211,921 B2 | 5/2007 | Frank et a | |
| 2004/0028954 A1* | 2/2004 | Arendt et al. | 428/701 |
| 2005/0227873 A1 | 10/2005 | Leghissa | |
| 2006/0293189 A1 | 12/2006 | Ries | |

FOREIGN PATENT DOCUMENTS

WO WO 2006/018402 A1 2/2006

OTHER PUBLICATIONS

Translation of WO 2006/018402, Feb. 2006.*

* cited by examiner

*Primary Examiner* — Paul Wartalowicz

(57) ABSTRACT

A winding for use in a superconducting electric generator having a rotating rotor assembly surrounded by a non-rotating stator assembly is provided. The winding comprises at least one conductor structure associated with a component in the superconducting electric generator. The conductor structure comprises a plurality of conductive elements formed from a high temperature superconductive material. At least a portion of the conductive elements is arranged in a transposed relationship. A protective shell is positioned about the conductive elements and formed from a high strength alloy suitable for cryogenic temperatures.

20 Claims, 6 Drawing Sheets

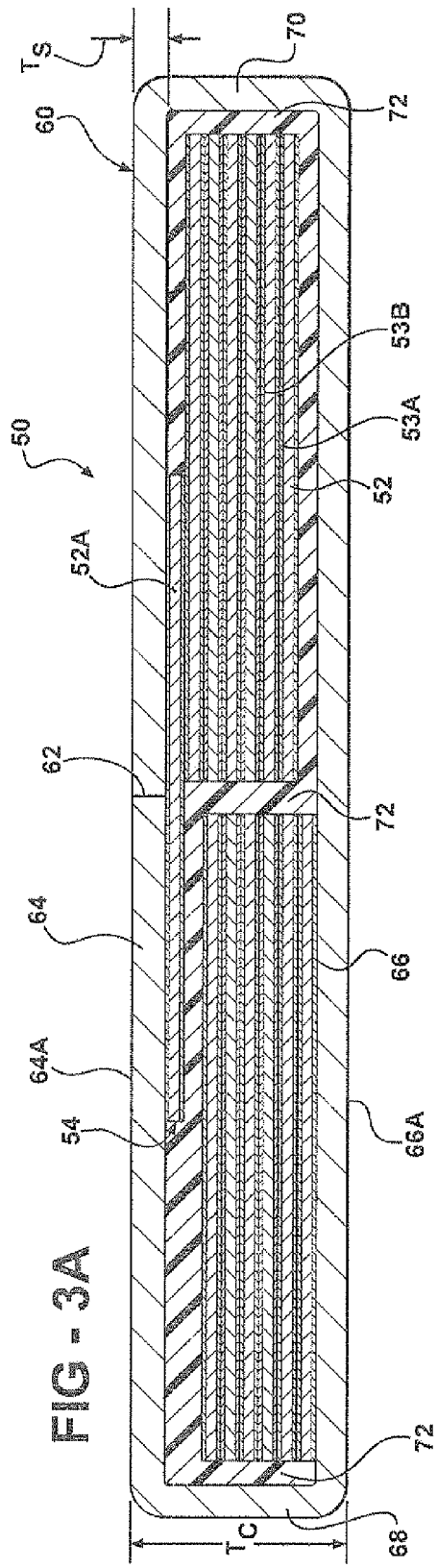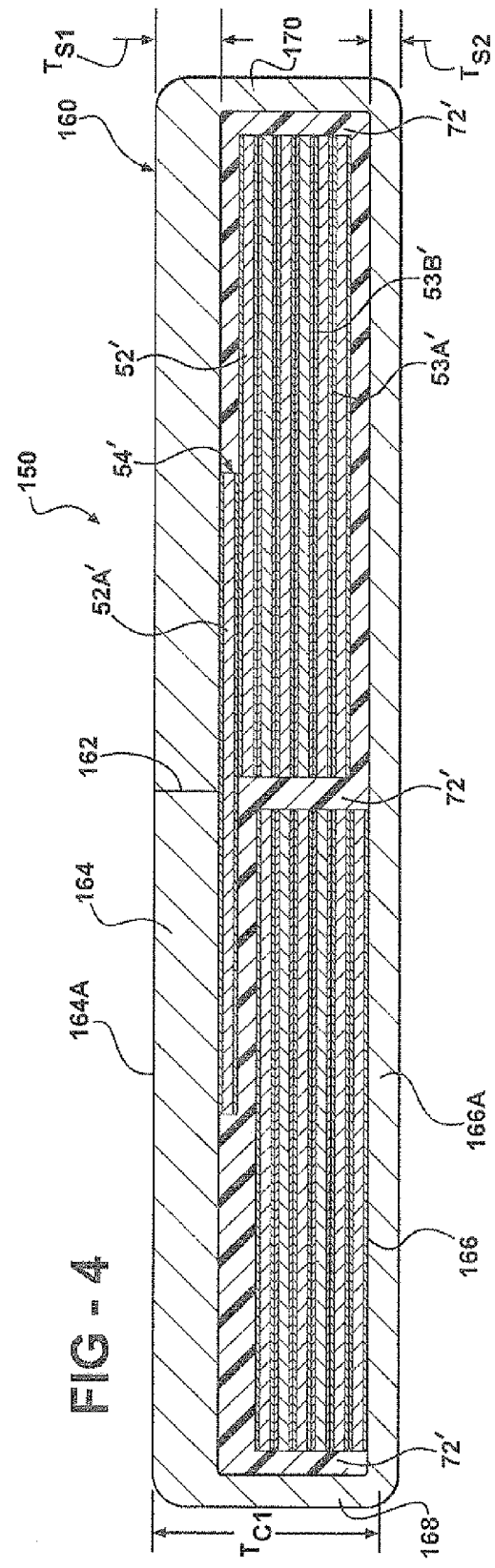

WINDING FOR USE IN HIGH TEMPERATURE SUPERCONDUCTING GENERATOR

This application claims the benefit of U.S. Provisional Application Ser. No. 60/918,406 entitled HIGH STRENGTH ROEBEL CONDUCTOR DESIGN FOR $2^{ND}$ GENERATION HIGH TEMPERATURE SUPERCONDUCTING WIRE, filed Mar. 16, 2007, the entire disclosure of which is incorporated by reference herein.

FIELD OF THE INVENTION

The present invention relates generally to a winding for use in a generator, and more particularly, to a winding comprising a Roebel structure for use in a high temperature superconducting electric generator.

BACKGROUND OF THE INVENTION

The efficiency of an electric generator can be improved by using high temperature superconducting windings (hereinafter HTS windings). However, the HTS windings are sensitive to mechanical bending and tensile stresses that can cause premature degradation and winding failure. For example, bends formed in high temperature superconducting rotor windings to circumscribe a cylindrical rotor core induce winding stresses. Normal centrifugal loads, thermal mechanical load, rotor torque, transient fault condition torques, and over-speed forces induce additional stress forces in the rotor windings. These over-speed and fault conditions substantially increase the centrifugal force loads on the rotor coil windings beyond the loads experienced during normal operating conditions.

SUMMARY OF THE INVENTION

In accordance with one aspect of the present invention, a winding for use in a superconducting electric generator having a rotating rotor assembly surrounded by a non-rotating stator assembly is provided. The winding comprises at least one conductor structure associated with a component in the superconducting electric generator. The conductor structure comprises a plurality of conductive elements formed from a high temperature superconductive material. At least a portion of the plurality of conductive elements is arranged in a transposed relationship. A protective shell is positioned about the conductive elements and formed from a high strength alloy suitable for cryogenic temperatures.

The winding may be wrapped about a core of the rotor assembly of the superconducting electric generator, and the core may define the component in the superconducting electric generator The conductive elements may be formed from yttrium barium copper oxide.

The protective shell may be formed from a stainless steel or an INCONEL alloy.

The thickness of the protective shell may be between about 0.1 millimeter and about 1 millimeter.

The protective shell may be formed from a single piece of material that is wrapped around the plurality of conductive elements.

One conductor structure may comprise one Roebel structure.

The conductive elements may include direction shifts, and the conductive elements may be cut and joined together at the direction shifts.

A stainless steel sheet may be bonded to each one of first and second opposing sides of each conductive element.

A polymeric filler that fills spaces between the plurality of conductive elements may be disposed in the protective shell.

In accordance with another aspect of the present invention, a rotor assembly for use in a superconducting electric generator is provided. The rotor assembly includes a rotor core and a superconducting winding. The superconducting winding comprises at least one conductor structure wrapped about the rotor core. The conductor structure comprises a plurality of conductive elements formed from a high temperature superconductive material and a protective shell positioned about the conductive elements. At least a portion of the plurality of conductive elements is arranged in a transposed relationship. The protective shell is formed from a high strength alloy suitable for cryogenic temperatures.

The conductor structure may comprise a first dimension extending between a first outer surface of a first portion of the protective shell and a second outer surface of a second portion of the protective shell. The first dimension may be generally transverse to the first and second outer surfaces. The conductor structure may further comprise a neutral axis positioned approximately mid-way along the first dimension between the first and the second outer surfaces of the first and second protective shell portions and parallel to the first and second outer surfaces. The conductor structure may extend about at least one corner of the rotor core. The conductor structure may have a radius of curvature extending from an origination point to the neutral axis no greater than about 125 millimeters.

The first outer surface of the protective shell first portion may be positioned nearer to the radius of curvature origination point than the second outer surface of the protective shell second portion.

The second portion of the protective shell may have a thickness greater than a thickness of the first portion of the protective shell such that the neutral axis is offset between a first inner surface of the first portion of the protective shell and a second inner surface of the second portion of the protective shell toward the second portion inner surface.

A greater number of the conductive elements may be in compression than in tension where the conductor structure extends about the rotor core corner.

The radius of curvature may be no greater than about 80 millimeters.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 3A is an enlarged cross sectional view of the conductor structure included in the field winding shown in FIG. 2A;

FIG. 4 is an enlarged cross sectional view a conductor structure in accordance with another embodiment of the invention;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
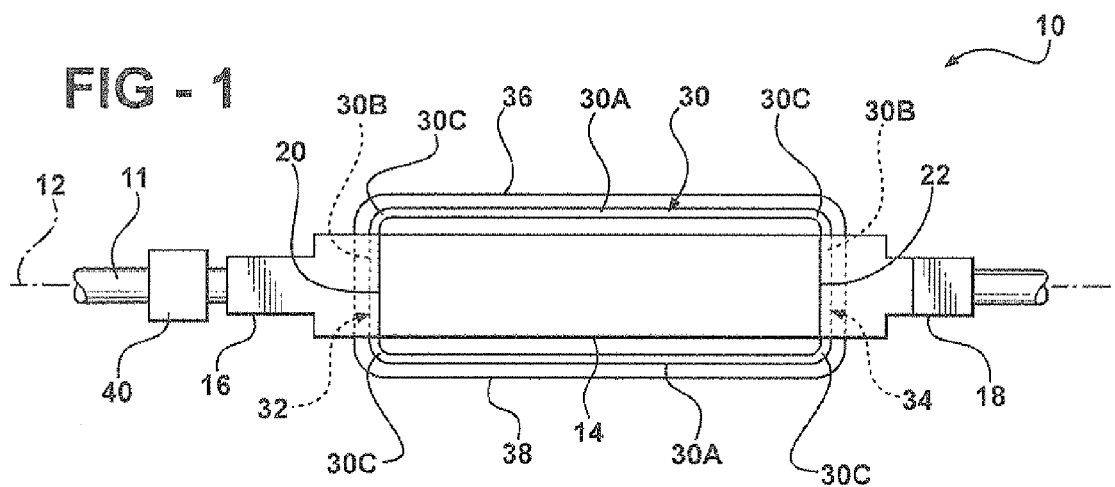
FIG. 1 is an illustration of a rotor assembly in accordance with an embodiment of the invention for use in a high temperature superconducting electric generator.
Figure 2:
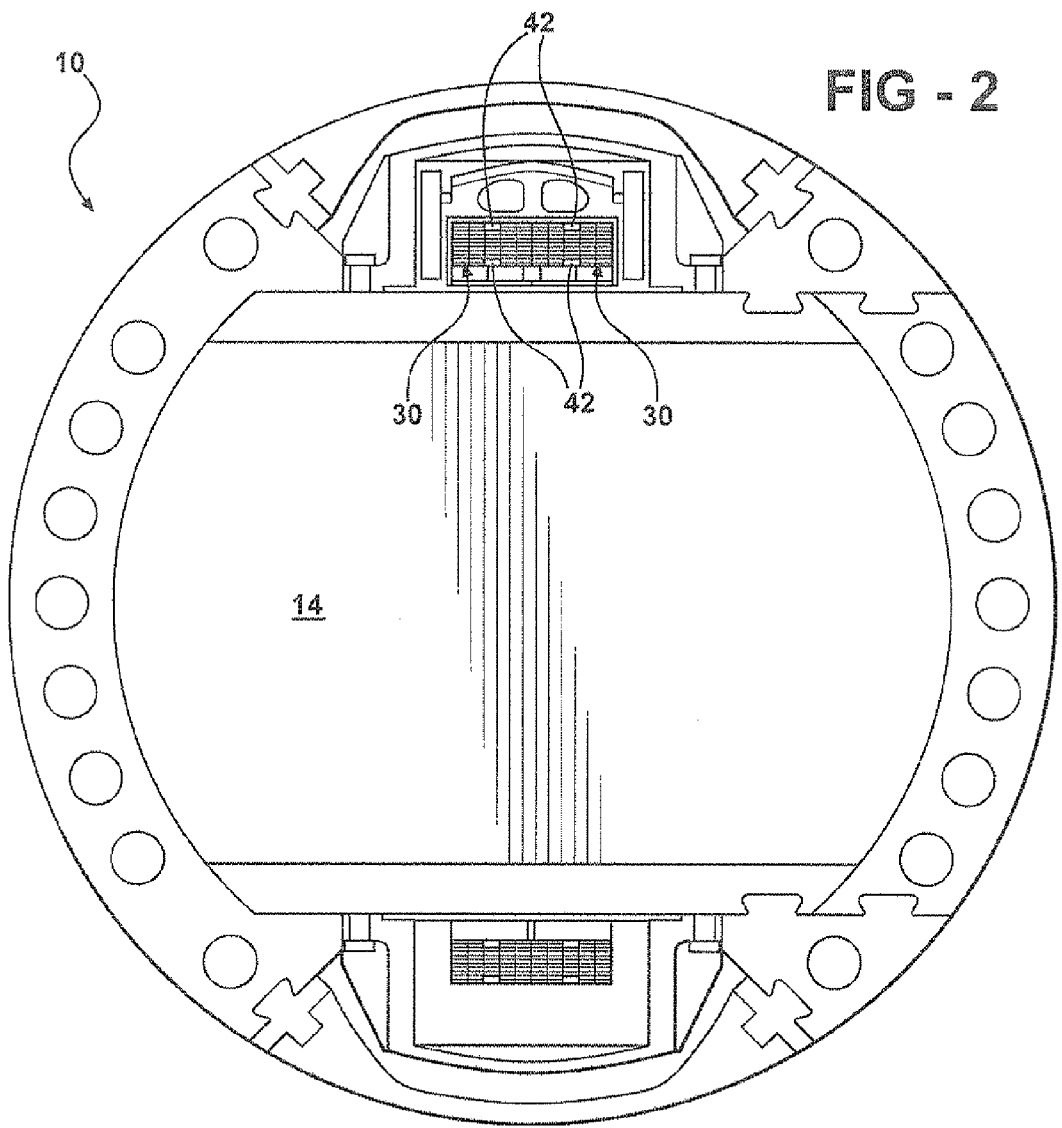
FIG. 2 is a cross sectional view of the rotor assembly illustrated in FIG. 1 taken along line 2-2.

FIGS. 1 and 2 illustrate a rotor assembly 10 for use in a high temperature superconducting electric generator. The rotor assembly 10 comprises a rotating shaft 11. The rotor assembly 10 is typically surrounded by a non-rotating stator assembly (not shown).

As shown in FIG. 1, the rotor assembly 10 comprises a longitudinal axis 12 and includes a generally cylindrically shaped rotor core 14 and coaxially aligned first and second end segments 16, 18. The rotor core 14 is formed from a material that exhibits a high magnetic permeability, for example, a ferromagnetic material such as iron. Each end segment 16, 18 is coupled to a respective one of first and second opposing ends 20, 22 of the rotor core 14 and includes a journal bearing (not shown) to facilitate attachment to a non-rotating frame (not shown) that surrounds the rotor assembly 10 and the non-rotating stator assembly.

The rotor assembly 10 further comprises at least one generally oval-shaped high temperature superconducting (HTS) coil or winding 30 (two shown in FIG. 2 but one discussed herein), which will be discussed in greater detail below. The winding 30 comprises axial portions 30A connected to radial portions 30B by transition portions 30C, see FIG. 1. The radial portions 30B extend through respective channels 32, 34 formed by respective portions of the end segments 16, 18 and opposing ends 20, 22 of the rotor core 14. Non-magnetic shields 36, 38 may enclose the winding 30 to provide insulation therefore.

Figure 2A:
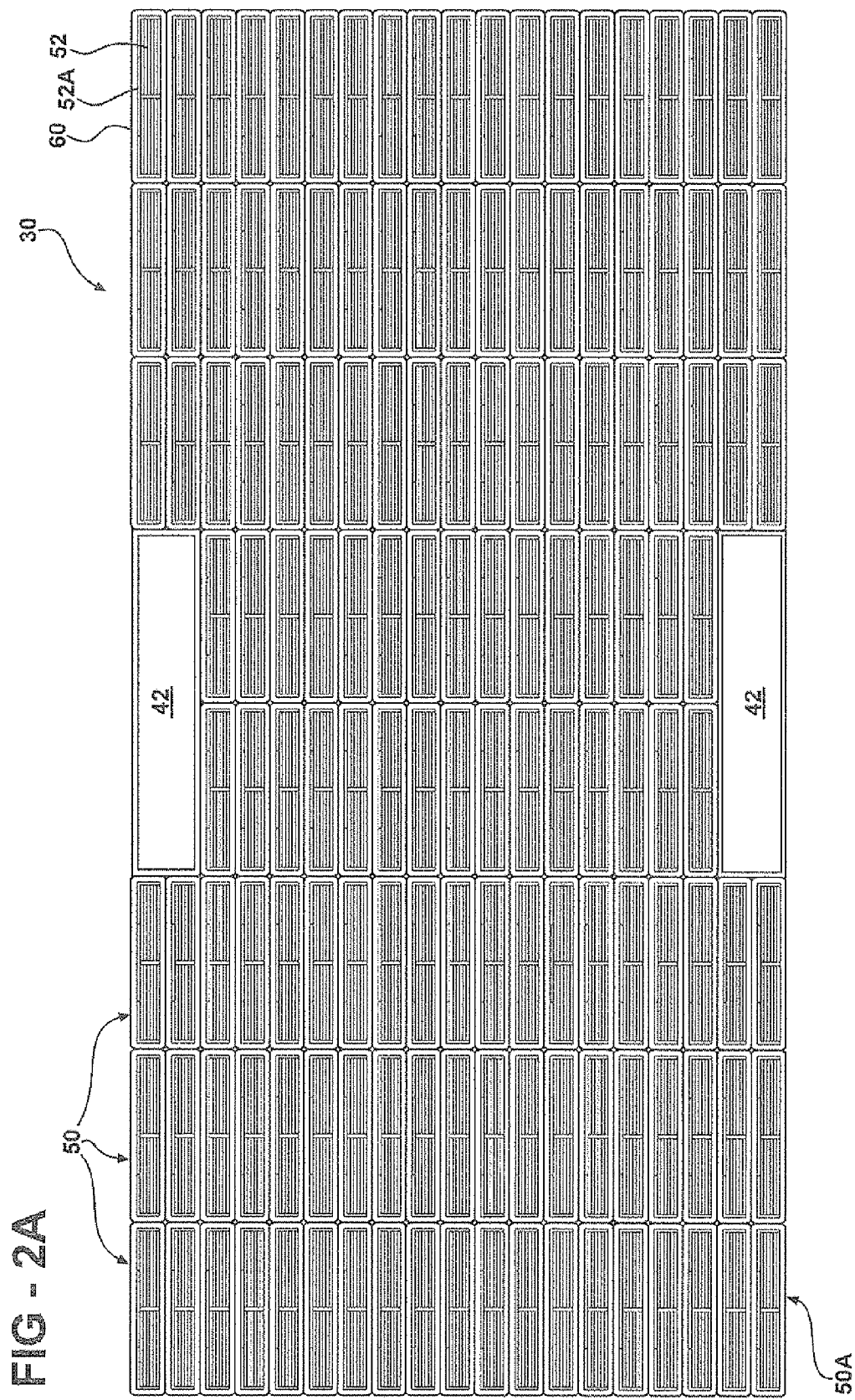
FIG. 2A is an enlarged cross sectional view of a field winding implemented in the rotor assembly illustrated in FIG. 2.

A cryogenic transfer coupling 40 as shown in FIG. 1 is disposed adjacent to the first end segment 16. The transfer coupling 40 supplies cooling fluid, such as, for example, liquid Neon, from a cryogenic cooler (not shown) to closed coolant flow paths or channels 42 disposed in the winding 30 as shown in FIGS. 2 and 2A. The cooling fluid is utilized to maintain the winding 30 at or below its critical temperature. From the channels 42, the coolant returns to the transfer coupling 40 then back to the cooler for lowering the cooling fluid temperature. This process is repeated continuously for cooling fluid circulation during operation of the generator.

Referring now to FIG. 2A, the winding 30 comprises a plurality of conductor structures 50 disposed adjacent the channels 42 in a plurality of columns and rows. In a preferred embodiment, between about 300 to about 400 conductor structures 50 are included in the winding 30, although the winding 30 may include any number of conductor structures 50.

Figure 3:
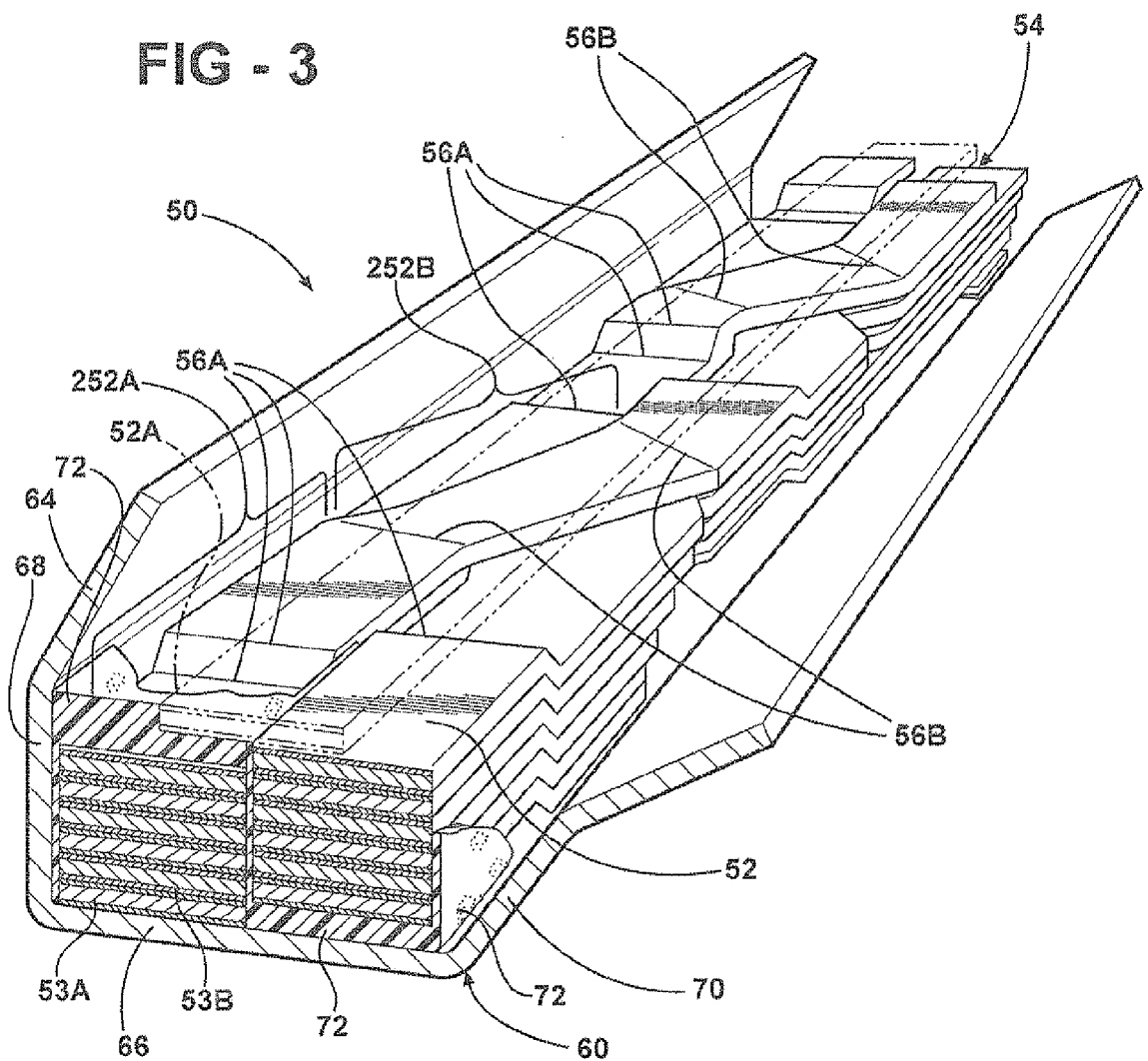
FIG. 3 is an enlarged perspective view of a conductor structure included in the field winding shown in FIG. 2A.

As more clearly shown in FIGS. 3 and 3A, each conductor structure 50 (one shown in FIGS. 3 and 3A and described herein) comprises a plurality of conductive elements 52 having rectangular cross sectional shapes. The conductive elements 52 are formed from a high temperature superconductive material, such as, for example, a yttrium barium copper oxide second generation HTS wire (hereinafter 2G wire) commercially available from American Superconductor, Inc. of Devens Mass. Optionally, as clearly illustrated in FIGS. 3 and 3A, the conductive elements 52 may include thin sheets of material 53A, 53B, such as stainless steel, for example, bonded to first and second opposed substantially flat sides thereof to increase the strength of the conductive elements 52. A wire provided with the thin sheets of material 53A, 53B is also available from American Superconductor, Inc. It is noted that the conductive elements 52 may be formed from a wire which does not include the thin sheets of material 53A, 53B.

In the embodiment illustrated, the conductor structure 50 includes thirteen conductive elements 52 disposed therein, wherein twelve of the conductive elements 52 are arranged in pairs, and the thirteenth, which is further designated as outer conductive element 52A, is disposed radially outwardly on the top pair. It is understood that more than thirteen or less than thirteen conductive elements 52 may be included in the conductor structure 50 as desired, although it has been found that between about nine and about seventeen conductive elements 52 are desirable. Further, it is understood that other types of arrangements of conductive elements 52 than that shown could be used.

The pairs of conductive elements 52 are arranged in a transposed relationship with the outer conductive element 52A disposed thereon. Because the pairs of conductive elements 52 are arranged in a transposed relationship, the conductor structure 50 defines a Roebel structure 54, as shown in FIG. 3, see commonly owned PCT application WO 2006/018402, which is incorporated by reference herein. The conductive elements 52 comprising the pairs of conductive elements 52 include radial and circumferential direction shifts 56A, 56B, (referring to the conductive element portions corresponding to the axial portions 30A of the winding 30).

To achieve the shape of the conductive elements 52 shown in FIG. 3, a single piece of material, in this embodiment 2G wire, having a width in the circumferential direction of approximately one pair of conductive elements 52 is provided. The 2G material is then cut and sections of the 2G wire material are removed to define a single conductive element 52 having sections 252A that extend along spaced apart but generally parallel axes connected by an angled intermediate section 252B. The remaining 2G wire material is then bent to define the radial direction shifts 56A. See U.S. Pat. App. Pub. No. 200510227873, the entire disclosure of which is incorporated by reference herein.

A protective shell 60 is positioned about the conductive elements 52. The protective shell 60 is formed from a high strength alloy suitable for cryogenic temperatures, such as, for example, stainless steel or an INCONEL alloy (INCONEL is a registered trademark of Special Metals Corporation). In the embodiment shown, the protective shell 60 is formed from a single piece of material that is wrapped around the conductive elements 52 and brazed or otherwise joined together at a joint 62, as shown in FIG. 3A. A thickness dimension $T_S$ of outer, inner, first side and second side portions 64, 66, 68, 70, respectively, of the protective shell 60 according to the embodiment shown in FIG. 3A is substantially uniform and is preferably between approximately 0.1 millimeters (mm) and about 1 mm thick. In this embodiment, the thickness dimension $T_S$ is about 0.25 mm. Optionally, a polymeric filler 72, such as an epoxy resin, may be disposed in the protective shell 60 in the embodiment illustrated to fill spaces between adjacent conductive elements 52, and also between the conductive elements 52 and the protective shell

60. It is noted that portions of the polymeric filler 72 have been removed from the structure shown in FIG. 3 to illustrate the conductive elements 52 more clearly.

The conductor structure 50 has an overall thickness dimension $T_C$ that extends between an outer surface 64A of the outer portion 64 of the protective shell 60 and an outer surface 66A of the inner portion 66 of the protective shell 60, see FIG. 3A. In the embodiment shown, the thickness dimension $T_C$ is between about 1.3 mm to about 1.8 mm, although the thickness dimension $T_C$ may vary based on the thickness dimension $T_S$ of the outer and inner portions 64, 66 of the protective shell 60, the number of conductive elements 52, and the amount of polymeric filler 72 disposed in the protective shell 60. The thickness dimension $T_C$ associated with portions of the conductor structure 50 corresponding to the axial portions 30A of the winding 30 is generally transverse to the longitudinal axis 12 of the rotor assembly 10, while the thickness dimension $T_C$ associated with portions of the conductor structure 50 corresponding to the radial portions 30B of the winding 30 is generally parallel to the longitudinal axis 12 of the rotor assembly 10.

Figure 5:
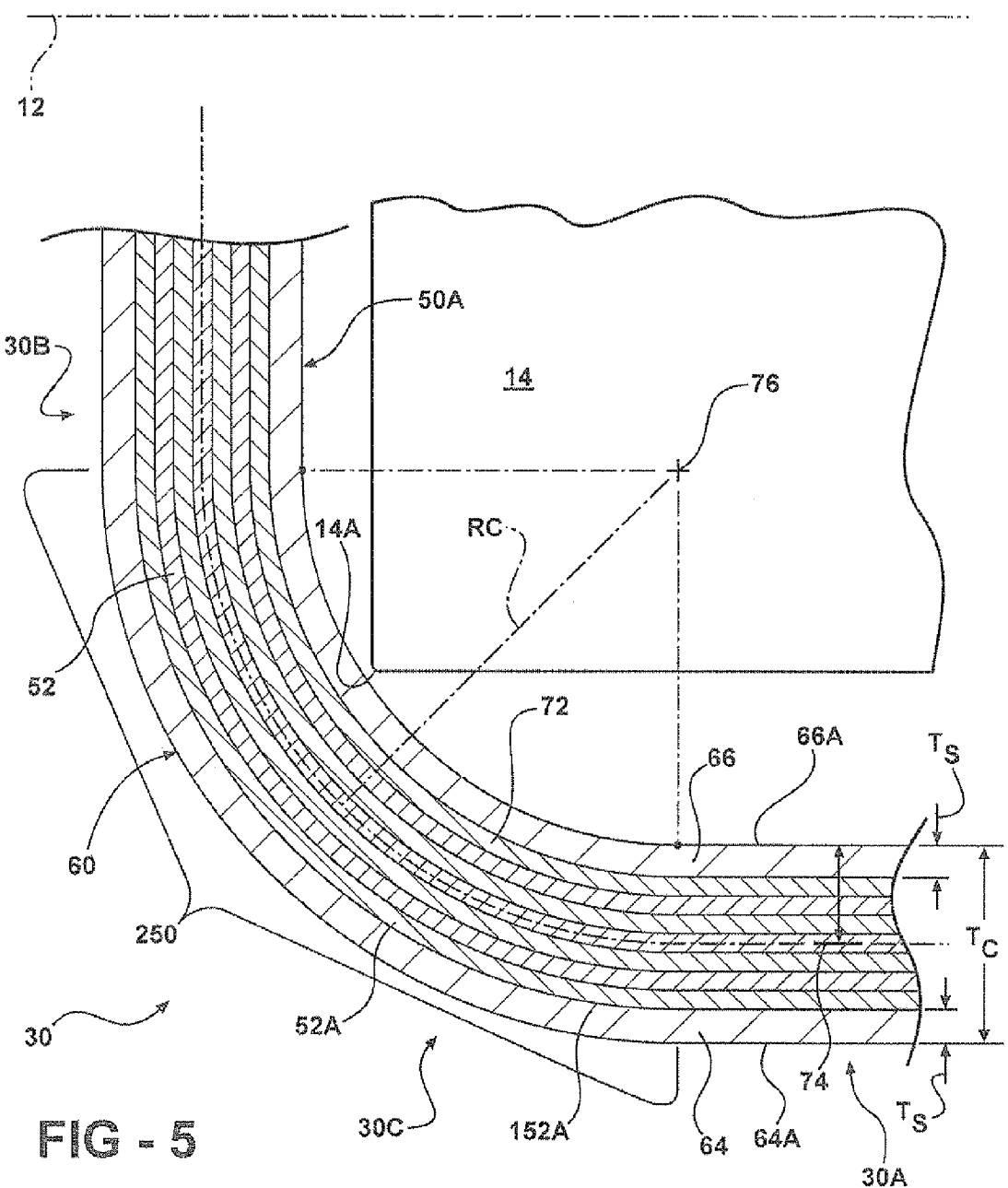
FIG. 5 is an enlarged fragmentary schematic illustration of the conductor structure illustrated in FIG. 3.

A radially innermost conductor structure 50A in FIG. 2A is shown in FIG. 5 having a neutral axis 74, wherein the axis 74 is positioned approximately mid-way along the thickness dimension $T_C$ of the conductor structure 50A between the outer surface 64A of the outer portion 64 of the protective shell 60 and the outer surface 66A of the inner portion 66 of the protective shell 60. The neutral axis 74 of portions of the conductor structure 50A corresponding to the axial portions 30A of the winding 30 is parallel to the longitudinal axis 12 of the rotor assembly 10, while the neutral axis 74 of portions of the conductor structure 50A corresponding to the radial portions 30B of the winding 30 is transverse to the longitudinal axis 12 of the rotor assembly 10.

Portions 250 of the conductor structure 50A corresponding to the transition portions 30C of the winding 30 extend about corners 14A of the rotor core 14 (one of the four corners 14A of the rotor core 14 is shown in FIG. 5). Each conductor structure portion 250 has a corresponding radius of curvature $R_C$ that extends from an origination point 76 to the neutral axis 74. In the embodiment shown, the radius of curvature $R_C$ is about 100 mm, but may be larger or smaller depending on the dimension thicknesses $T_S$, $T_C$, of the protective shell 60 and the conductive element 50A, respectively, as will be explained below. As shown in FIG. 5, the outer surface 66A of the inner portion 66 of the protective shell 60 is positioned nearer to the origination point 76 than the outer surface 64A of the outer portion 64 of the protective shell 60.

The conductive elements 52 in the conductive structure 50A need to meet tensile strain requirements during manufacturing and operation for incorporation into the rotor assembly 10 of the superconducting electric generator. Specifically, 2G wire formed from yttrium barium copper oxide is believed to have a maximum allowable tensile strain of 0.4% to prevent degradation of the conductive elements 52. The 0.4% tensile strain limits the minimum radius of curvature ($R_{min}$) permitted for the conductive elements 52 about the corners 14A of the rotor core 14. The minimum radius of curvature ($R_{min}$) is calculated using a known equation based on the maximum tensile strain (S) for a conductive element 52 and the distance ($\Delta R$) of an outermost surface 152A of an outermost conductive element 52A within the conductive structure 50A from the neutral axis 74, such equation being $S = \Delta R / R_{min}$.

In a prior art Roebel conductor structure, wherein the prior art Roebel conductor structure did not include a protective shell, an effective amount of matrix resin was employed between stacked conductive elements to bond the conductive elements together for structural integrity. This resulted in a conductor structure having a thickness of around 2 mm wherein an outer conductive element was located approximately 1 mm from a neutral axis of the Roebel conductor structure. Such a prior art conductor structure had a minimum radius of curvature ($R_{min}$) of approximately 250 mm (calculated using the equation above, wherein the maximum tensile strain of 2 g wire is 0.4%, and the distance of the outermost conductive element from the neutral axis was 1 mm).

The protective shell 60 used in the conductor structure 50 of the present invention eliminates or reduces the need for matrix resin or polymeric filler between stacked conductive elements as used in the prior art Roebel conductor structure to bond the conductive elements together, since the protective shell 60 effectively holds the conductive elements 52 together. Accordingly, the overall thickness dimension $T_C$ of the conductor structure 50A of the present invention is believed to be reduced as compared to the thickness dimension of the prior art Roebel conductor structures.

Referring again to FIG. 5, for a thickness dimension $T_C$ of the conductor structure 50A of approximately 1.3 mm and a thickness dimension $T_S$ of the protective shell 60 of approximately 0.25 mm, an outer surface 152A of the outer conductive element 52A is located about 0.4 mm from the neutral axis 74. Using the above equation for strain, presuming the maximum tensile strain (S) for the outer conductive element 52A is 0.4%, and presuming the distance ($\Delta R$) of the outer surface 152A of the outer conductive element 52A from the neutral axis 74 is 0.4 mm, a minimum acceptable radius of curvature $R_{min}$ for the outer conductive element 52A is calculated to be approximately 100 mm. Hence, a radius of curvature $\geq 100$ mm is deemed to be acceptable.

A smaller minimum radius of curvature $R_{min}$ permits the winding 30 to be more closely wound around the corners 14A of the rotor core 14 so that the winding 30 need not extend so far axially and radially outwardly from the rotor core 14. Accordingly, the rotor assembly 10 is permitted to be smaller in size than prior art rotor assemblies having larger minimum bending radii. Further, the protective shell 60 protects the Roebel conductors 54 disposed therein from damage during manufacturing and handling.

FIG. 4 illustrates a conductor structure 150 according to another embodiment of the present invention, wherein similar structure to that described above for the embodiment illustrated in FIGS. 1-3A and 5 includes the same reference number followed by a prime (') symbol. The conductor structure 150 includes a plurality of conductive elements 52' that are arranged to form a Roebel structure 54' as discussed above for FIGS. 1-3A and 5. In the embodiment illustrated, thin sheets of material 53A', 53B' are bonded to each one of opposed sides of each of the conductive elements 52', although the thin sheets of material 53A', 53B' are not required to practice the invention.

A protective shell 160 is wrapped about the conductive elements 52'. The protective shell 160 is formed from a high strength alloy suitable for cryogenic temperatures, such as, for example, stainless steel or an INCONEL alloy. In the embodiment shown, the protective shell 160 is formed from a single piece of material that is wrapped around the conductive elements 52' and brazed or otherwise joined together at a joint 162. A thickness dimension $T_{S1}$ of an outer portion 164 of the protective shell 160 is greater than a thickness dimension $T_{S2}$ of an inner portion 166 and first and second side portions 168, 170 of the protective shell 160. In the embodiment shown, the thickness dimension $T_{S1}$ of the outer portion 164 of the protective shell 160 is about 0.5 mm, and the thickness dimension $T_{S2}$ of the inner portion 166 and first and second side portions 168, 170 of the protective shell 160 is about 0.25 mm. It is understood that one or a plurality of sheets of material may be used to form the outer portion 164 of the protective shell 160. In the embodiment illustrated, a polymeric filler 72' is disposed in the protective shell 160 to fill spaces between adjacent conductive elements 52', and also between the conductive elements 52' and the protective shell 160.

A winding 130 may include between about 300 to about 400 conductor structures 150. The conductor structure 150 may have an overall thickness dimension $T_{C1}$ that extends between an outer surface 164A of the outer portion 164 of the protective shell 160 and an outer surface 166A of the inner portion 166 of the protective shell 160. In the embodiment shown, the thickness dimension $T_{C1}$ is about 1.55 mm, although the thickness dimension $T_{C1}$ may vary based on the thickness dimension $T_{S1}$ of the outer portion 164 of the protective shell 160, the thickness dimension $T_{S2}$ of the inner portion 166 of the protective shell 160, the number of conductive elements 52', and the amount of polymeric filler 72' disposed in the protective shell 160. The thickness dimension $T_{C1}$ associated with portions of the conductor structure 150 corresponding to axial portions 130A of the winding 130 is generally transverse to a longitudinal axis of a rotor assembly in which the winding 130 is included. The thickness dimension $T_{C1}$ associated with portions of the conductor structure 150 corresponding to radial portions 130B of the winding 130 is generally parallel to the longitudinal axis of the rotor assembly.

Figure 6:
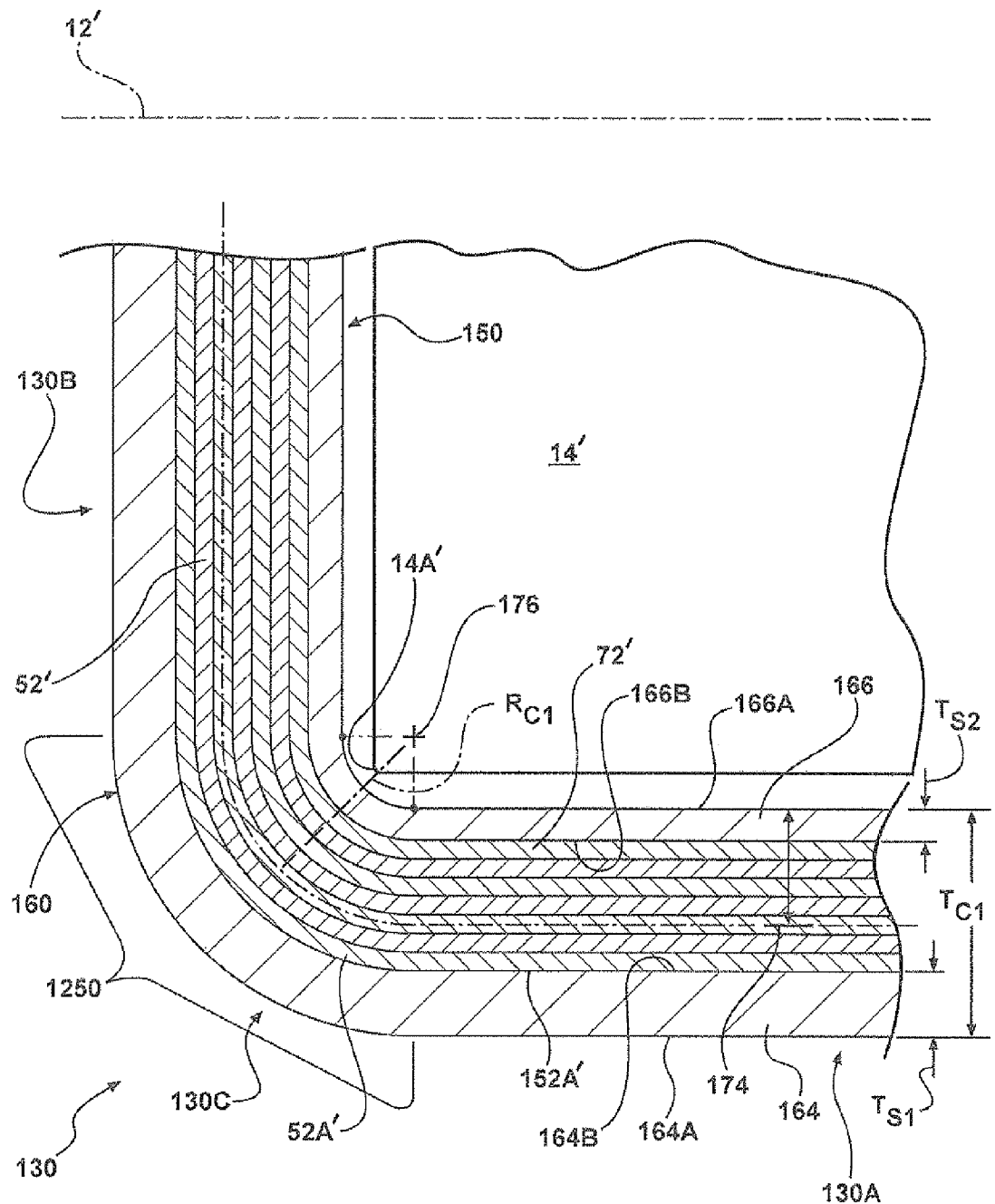
FIG. 6 is an enlarged fragmentary schematic illustration of the conductor structure illustrated in FIG. 4.

Referring now to FIG. 6, a neutral axis 174 of the conductor structure 150 is positioned approximately mid-way along the thickness dimension $T_{C1}$ of the conductor structure 150 between the outer surface 164A of the outer portion 164 of the protective shell 160 and the outer surface 166A of the inner portion 166 of the protective shell 160. As a result of the thickness dimension $T^{S1}$ of the outer portion 164 being greater than the thickness dimension $T_{S2}$ of the inner portion 166, the neutral axis 174 is offset between an inner surface 164B of the outer portion 164 of the protective shell 160 and an inner surface 166B of the inner portion 166 of the protective shell 160 toward the inner surface 164B of the outer portion 164. This effectively places the neutral axis 174 closer to an outer conductive element 52A' of the conductor structure 150. The neutral axis 174 of portions of the conductor structure 150 corresponding to the axial portions 130A of the winding 130 is parallel to the longitudinal axis 12' of the rotor assembly, while the neutral axis 174 of portions of the conductor structure 150 corresponding to the radial portions 130B of the winding 130 is transverse to the longitudinal axis 12' of the rotor assembly.

Portions 1250 of the conductor structure 150 corresponding to the transition portions 130C of the winding 130 extend about corners 14A' of a rotor core 14' (one of the four corners 14A' of the rotor core 14' is shown in FIG. 6). Each conductor structure portion 1250 has a corresponding radius of curvature $R_{C1}$ that extends from an origination point 176 to the neutral axis 174. In the embodiment shown, the radius of curvature $R_{C1}$ is about 69 mm, but may be larger or smaller depending on the dimension thicknesses $T_{S1}$, $T_{S2}$, $T_{C1}$ of the outer portion 164 of the protective shell 160, the inner portion 166 of the protective shell 160, and the conductive element 150, respectively, as will be explained below. As shown in FIG. 6, the outer surface 166A of the inner portion 166 of the protective shell 160 is positioned nearer to the origination point 176 than the outer surface 164A of the outer portion 164 of the protective shell 160.

As discussed above with respect to the embodiment illustrated in FIGS. 1-3A and 5, the protective shell 160 reduces or eliminates the need for a matrix resin or polymeric filler between the stacked conductive elements 52'. Hence, the overall thickness dimension $T_{C1}$ of the conductor structure 150 is believed to be thinner than that of the prior art Roebel conductor structures. Since the neutral axis 174 is offset toward the inner surface 164B of the outer portion 164 of the protective shell 160 and the amount of matrix resin or polymeric filler between the conductive elements 52' has been reduced, the outer surface 152A' of the outer conductive element 52A' is located close to the neutral axis 174 of the conductor structure 150. Consequently, a small radius of curvature $R_{C1}$ can be achieved. For example, for a thickness dimension $T_{C1}$ of the conductor structure 150 of approximately 1.55 mm, a thickness dimension $T_{S1}$ of the outer portion 164 of the protective shell 160 of approximately 0.5 mm, and a thickness dimension $T_{S2}$ of the inner portion 166 of the protective shell 160 of approximately 0.25 mm, the outer surface 152A' of the outer conductive element 52A' is located about 0.275 mm from the neutral axis 174. Using the above equation for strain, presuming the maximum tensile strain (S) for the outer conductive element 52A' is 0.4%, and presuming the distance ($\Delta$R) of the outer conductive element 52A' from the neutral axis 174 is 0.275 mm, a minimum radius of curvature $R_{C1}$ for the conductive element 52A' is calculated to be approximately 68.75 mm.

Advantages realized by the smaller radius of curvature $R_{C1}$ are the same as those discussed above for the embodiment of FIGS. 1-3A and 5. Although the maximum tensile strain is restricted at 0.4% for 2G wires, it is believed that the maximum compressive strain for 2G wires formed from yttrium barium copper oxide can be higher than 1%. Further in this embodiment, a greater number of the conductive elements 52' are in compression than in tension where the winding 130 extends about the corners 14A' of the rotor core 14' due to a larger number of conductive elements 52' being located radially inwardly from the neutral axis 174 than the number of conductive elements 52' being located radially outwardly from the neutral axis 174. Accordingly, failure of the conductive elements 52' due to exertion of tensile strain forces greater than the maximum tensile strain of the conductive elements 52' is more effectively avoided. Hence, the embodiment of FIGS. 4 and 6 takes advantage of the higher compressive strain capability of 2G wire.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A winding for use in a superconducting electric generator having a rotating rotor assembly surrounded by a non-rotating stator assembly comprising:
   at least one conductor structure associated with a component in the superconducting electric generator, said at least one conductor structure comprising:
   a plurality of conductive elements formed from a high temperature superconductive material, wherein at least a portion of said plurality of conductive elements is arranged in a transposed relationship; and
   a protective shell wrapped around all exposed surfaces of said conductive elements and formed from a high strength alloy suitable for cryogenic temperatures.

2. The winding as set out in claim 1, wherein said winding is wrapped about a core of the rotor assembly of the superconducting electric generator, the core defining the component in the superconducting electric generator.

3. The winding as set out in claim 1, wherein said conductive elements are formed from yttrium barium copper oxide.

4. The winding as set out in claim 1, wherein said protective shell is formed from one of a stainless steel and an INCONEL alloy.

5. The winding as set out in claim 1, wherein a thickness of said protective shell is between about 0.1 millimeter and about 1 millimeter.

6. The winding as set out in claim 1, wherein said protective shell is formed from a single piece of material.

7. The winding as set out in claim 1, wherein said at least one conductor structure comprises one Roebel structure.

8. The winding as set out in claim 1, wherein said conductive elements include direction shifts and wherein said conductive elements are cut and joined together at said direction shifts.

9. The winding as set out in claim 1, wherein a stainless steel sheet is bonded to each one of first and second opposing sides of each conductive element.

10. The winding as set out in claim 1, further comprising a polymeric filler disposed in said protective shell, wherein said polymeric filler fills spaces between said plurality of conductive elements.

11. A rotor assembly for use in a superconducting electric generator comprising:
   a rotor core having a substantially circular cross-section between a first and a second axially extending substantially flat surface region, each of the first and second surface regions defined by first and second opposing edges; and
   a superconducting winding comprising at least one conductor structure wrapped about said rotor core, said at least one conductor structure comprising:
      a plurality of conductive elements formed from a high temperature superconductive material, wherein at least a portion of said plurality of conductive elements is arranged in a transposed relationship;
      a protective shell wrapped around all exposed surfaces of said conductive elements and formed from a high strength alloy suitable for cryogenic temperatures;
      a first dimension extending between a first outer surface of a first portion of said protective shell and a second outer surface of a second portion of said protective shell, said first dimension being generally transverse to said first and second outer surfaces; and
      a neutral axis positioned approximately mid-way along said first dimension between said first and said second outer surfaces of said first and second protective shell portions and parallel to said first and second outer surfaces;
   wherein a portion of said at least one conductor structure extending about at least one corner of said rotor core rotor core has a radius of curvature extending from an origination point to said neutral axis no greater than about 125 millimeters.

12. The rotor assembly of claim 11, wherein said conductive elements are formed from yttrium barium copper oxide.

13. The rotor assembly as set out in claim 11, wherein said protective shell is formed from one of a stainless steel and an INCONEL alloy, a thickness of said protective shell is between about 0.1 millimeter and about 1 millimeter, and said protective shell is formed from a single piece of material.

14. The rotor assembly as set out in claim 11, wherein said at least one conductor structure comprises one Roebel structure.

15. The rotor assembly as set out in claim 11, further comprising a polymeric filler disposed in said protective shell, wherein said polymeric filler fills spaces between said plurality of conductive elements.

16. The rotor assembly as set out in claim 11, wherein said first outer surface of said protective shell first portion is positioned nearer to said origination point of said radius of curvature than said second outer surface of said protective shell second portion.

17. The rotor assembly as set out in claim 16, wherein said second portion of said protective shell has a thickness greater than a thickness of said first portion of said protective shell such that said neutral axis is offset between a first inner surface of said first portion of said protective shell and a second inner surface of said second portion of said protective shell toward said second portion inner surface.

18. The rotor assembly as set out in claim 17, wherein a greater number of said conductive elements are in compression than in tension where said conductor structure extends about said rotor core corner.

19. The rotor assembly as set out in claim 17, wherein said radius of curvature is no greater than about 80 millimeters.

20. A winding for use in a superconducting electric generator having a rotating rotor assembly including a rotor core surrounded by a non-rotating stator assembly, the winding comprising:
   at least one conductor structure that is adapted to extend around the rotor core of the rotor assembly and including a portion that is adapted to extend about at least one corner of the rotor core, said at least one conductor structure comprising:
      a plurality of conductive elements formed from a high temperature superconductive material, wherein at least a portion of said plurality of conductive elements is arranged in a transposed relationship;
      a protective shell wrapped around all exposed surfaces of said conductive elements and formed from a high strength alloy suitable for cryogenic temperatures;
      a first dimension extending between a first outer surface of a first portion of said protective shell and a second outer surface of a second portion of said protective shell, said first dimension being generally transverse to said first and second outer surfaces; and
      a neutral axis positioned approximately mid-way along said first dimension between said first and said second outer surfaces of said first and second portions of said protective shell and positioned parallel to said first and second outer surfaces;
   wherein the portion of the at least one conductor structure that is adapted to extend about the at least one corner of the rotor core has a radius of curvature extending from an origination point to said neutral axis of no greater than about 125 millimeters.

* * * * *